United States Patent
Lucienne et al.

(10) Patent No.: US 9,505,303 B2
(45) Date of Patent: Nov. 29, 2016

(54) HYDRAULIC APPARATUS COMPRISING AN IMPROVED ASSEMBLY OF A HYDRAULIC MACHINE AND A CLUTCH

(71) Applicant: Poclain Hydraulics Industrie, Verberie (FR)

(72) Inventors: Philippe Raymond Lucienne, Verberie (FR); Bohdan Hornacek, Trencin (SK); Viktor Kuban, Trencin (SK); Jean A. Heren, Verberie (FR); Christophe Gouzou, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 650 days.

(21) Appl. No.: 13/900,464

(22) Filed: May 22, 2013

(65) Prior Publication Data

US 2013/0316874 A1 Nov. 28, 2013

(30) Foreign Application Priority Data

May 24, 2012 (FR) .................... 12 54767

(51) Int. Cl.
| | |
|---|---|
| *B60K 17/10* | (2006.01) |
| *F16H 45/00* | (2006.01) |
| *F16D 25/08* | (2006.01) |
| *F04B 1/12* | (2006.01) |
| *F04B 1/20* | (2006.01) |
| *F03C 1/06* | (2006.01) |
| *F16D 13/52* | (2006.01) |

(52) U.S. Cl.
CPC ............. *B60K 17/10* (2013.01); *F03C 1/0607* (2013.01); *F03C 1/0644* (2013.01); *F04B 1/128* (2013.01); *F04B 1/2014* (2013.01); *F16D 25/082* (2013.01); *F16D 25/083* (2013.01); *F16D 13/52* (2013.01); *F16H 2045/002* (2013.01); *Y10T 477/73* (2015.01)

(58) Field of Classification Search
CPC ...... F04B 1/128; F04B 1/2014; F04B 17/05; F16D 25/082; F16D 25/083; B60K 17/10; F16H 2045/002
See application file for complete search history.

(56) References Cited

U.S. PATENT DOCUMENTS

| | | | |
|---|---|---|---|
| 5,221,101 A | 6/1993 | Okubo et al. | |
| 7,077,256 B2 * | 7/2006 | Gratzer | F16D 25/0638 192/103 F |
| 2004/0033144 A1* | 2/2004 | Rush | F04B 1/128 417/223 |
| 2009/0210120 A1 | 8/2009 | Stein et al. | |
| 2013/0327031 A1* | 12/2013 | Bohn | F04B 17/05 60/435 |

FOREIGN PATENT DOCUMENTS

| | | | | |
|---|---|---|---|---|
| GB | 1423125 A | * | 1/1976 | ............. F16H 47/04 |
| WO | WO 02/079661 | | 10/2002 | |
| WO | WO 03/046380 | | 6/2003 | |

* cited by examiner

*Primary Examiner* — Richard Lorence
(74) *Attorney, Agent, or Firm* — Blakely Sokoloff Taylor & Zafman LLP

(57) ABSTRACT

A hydraulic apparatus including a machine shaft having a proximal end and a distal end, adapted to drive a cylinder block. A clutch having a clutch shaft having a proximal end and a distal end, and a plurality of friction discs linked to the distal end of the clutch shaft and a plurality of friction discs linked to the proximal end of the machine shaft for selectively engaging the clutch shaft with the machine shaft. The friction discs are disposed radially around the machine shaft. The distal end of the clutch shaft is bell-shaped so as to surround the proximal end of the machine shaft. The bell shape defines an inner space where the proximal end of the machine shaft and the friction discs linked to the clutch shaft are located.

18 Claims, 6 Drawing Sheets

- - Prior Art - -

HYDRAULIC APPARATUS COMPRISING AN IMPROVED ASSEMBLY OF A HYDRAULIC MACHINE AND A CLUTCH

TECHNICAL FIELD

This invention concerns the field of clutcheable hydraulic machines, for instance hydraulic pumps or motors.

STATE OF THE ART

Hydraulic devices, such as pumps or motors are associated with a clutch allowing engagement and disengagement of said hydraulic device according to the needs of the system where they are integrated.

Hydraulic pumps and motors are conventionally manufactured as independent units in a given casing, and are afterwards associated to a clutch, which is linked to a shaft protruding from the casing of the pump or motor, thereby forming an assembly comprising a hydraulic device with a clutch.

Published document WO 03/046380 discloses such an assembly, which is illustrated in FIG. 1.

The assembly 1 as illustrated is made by the association of a clutch 2 and a hydraulic device 3. This association is typically made by bolting the casing of the clutch 2 to the casing of the hydraulic device 3.

The assembly 1 comprises a drive shaft 4 extending through the length of the assembly 1, and a shaft member 5 which extends around the drive shaft 4, on a limited portion of said drive shaft.

In the illustrated assembly 1, the drive shaft 4 and shaft member 5 are each associated to friction discs respectively 6 and 7, which are adapted to engage each other by friction or to be separated (and therefore not in contact) through the application of a command by piloting means 8, so as to engage or not the rotation of the drive shaft 4 with the rotation of the shaft member 5.

The centering of the drive shaft 4 and of the shaft member 5 is achieved through the use of at least two bearings for the drive shaft and two bearings for the shaft member. The two bearings of the drive shaft are located at both its ends; one in the clutch casing and one in the distributor of the hydraulic device 3. The two bearings of the shaft member 5 are located between the two bearings of the drive shaft 4; at each ends of the shaft member 5; one in the hydraulic device 3 near its end linked to the clutch 2, and one in the distributor of the hydraulic device 3.

This assembly illustrated in FIG. 1 illustrates the technical issues raised by such an assembly, which requires an important amount of space, and requires an extremely strict positioning of the drive shaft relatively to the shaft member. Such an assembly therefore has important drawbacks in terms of use for its positioning in a system, and for its manufacturing due to the extremely severe dimensional tolerances that it requires.

PRESENTATION OF THE INVENTION

The present invention aims at providing a device which solves these technical issues, and proposes a hydraulic apparatus comprising a hydraulic machine comprising a machine shaft adapted to drive a cylinder block, said machine shaft having a proximal end and a distal end, a clutch comprising a clutch shaft having a proximal end and a distal end, and engaging means for selectively engaging said clutch shaft with said machine shaft, said engaging means comprising a plurality of friction discs linked to the distal end of the clutch shaft and a plurality of friction discs linked to the proximal end of the machine shaft, said discs being disposed radially around said machine shaft, characterized in that the distal end of said clutch shaft is bell-shaped so as to surround the proximal end of said machine shaft, said bell shape defining an inner space where the proximal end of the machine shaft and the friction discs linked to the clutch shaft are located.

In an example embodiment, said hydraulic machine is a hydraulic engine or a hydraulic pump.

In a further embodiment, said apparatus further comprises piloting means, a clutch piston and a thrust washer surrounding said machine shaft, said piloting means being adapted to apply a piloting pressure on said clutch piston, which transmits this piloting pressure to said thrust washer, which itself transmits this piloting pressure to said engaging means.

Said machine shaft and clutch shaft are for instance located within a machine defining a common inner space which holds both shafts, said machine shaft being connected to said casing by two machine bearings, said clutch shaft being connected to the casing by a single clutch bearing, and said machine shaft and clutch shaft are connected by a centering bearing adapted to provide a centering of said shafts relative to each other. Said clutch piston is typically bell-shaped and at least partially surrounds said machine bearing.

In a variant of this previous example, said casing typically comprises a machine casing within which is located the hydraulic machine, and a clutch casing within which is located the clutch, said casings defining a common internal space, the clutch piston being located within the machine casing so that its displacement brings it into contact with the thrust washer located within the clutch casing. The clutch piston can then be associated with a piston spring resting on the clutch casing, and opposing the displacement of the clutch piston resulting from an increase in pressure within the chamber of the clutch piston.

In another variant of said further embodiment, said piloting means comprise an accumulator, a compressor, a pump (for instance a. scavenging pump), or any hydraulic circuitry adapted to feed said piloting means.

The invention also relates to a vehicle comprising a hydraulic apparatus as defined previously.

In a specific embodiment, the clutch shaft is linked to a main engine of said vehicle, and which comprises a charge pump coupled to the engine shaft, upstream of the shaft relatively to the main engine, said charge pump being linked to piloting means so that it selectively flushes the clutch, charges the hydraulic machine and activates the clutch.

The invention therefore provides a hydraulic apparatus comprising a hydraulic machine provided with a clutch, with an increased compactness and improved spatial relationships between the various components.

PRESENTATION OF THE DRAWINGS

Other characteristics, goals and advantages of the invention are shown in the following description, which is strictly illustrative and non limiting, and which has to be read together with the annexed drawings, wherein:

FIG. 1, which was described previously, presents an example of hydraulic assembly according to state of the art;

DETAILED DESCRIPTION

Figure 2:
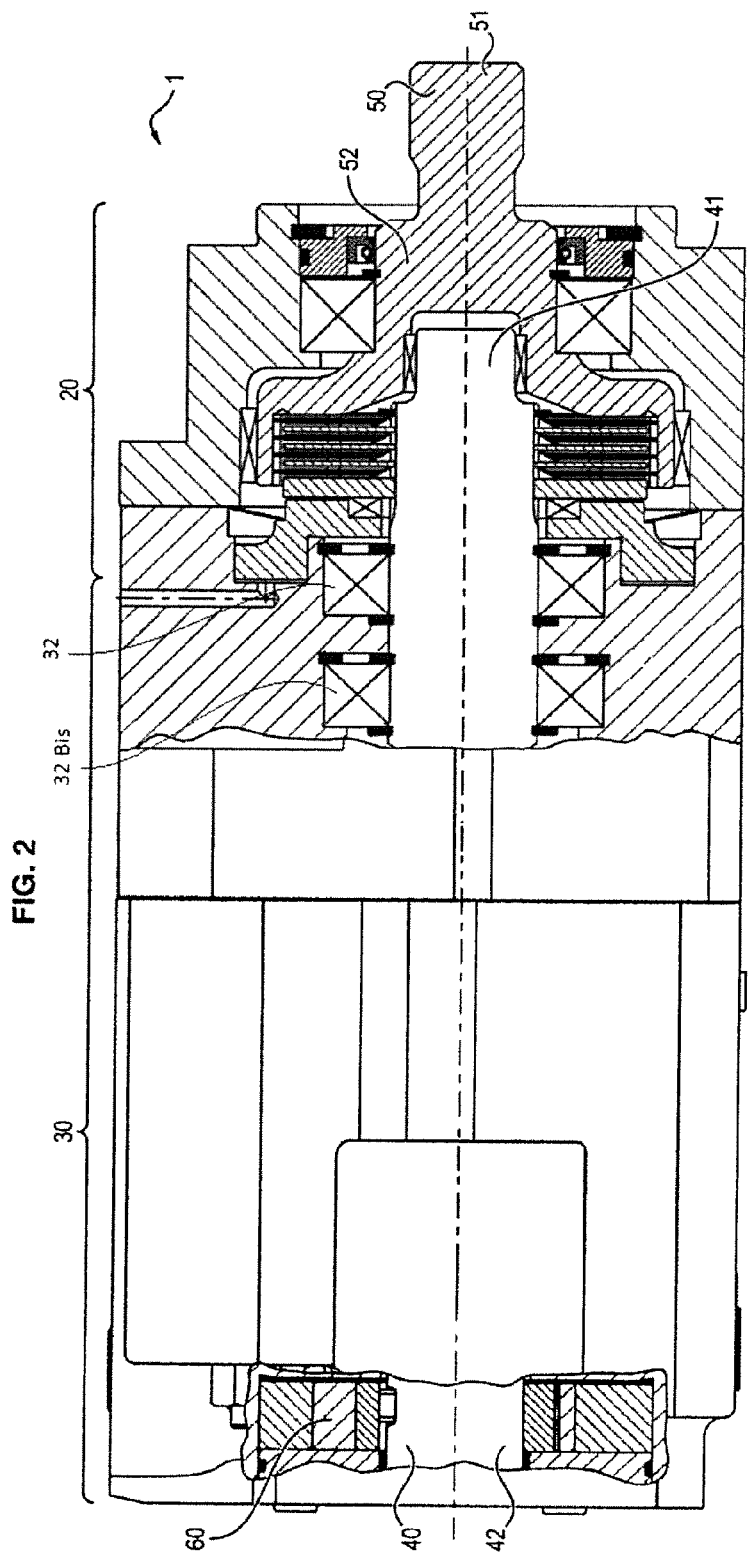
FIGS. 2 and 3 illustrate respectively a global view and a detailed view of a hydraulic apparatus according to an aspect of the invention.
Figure 3:
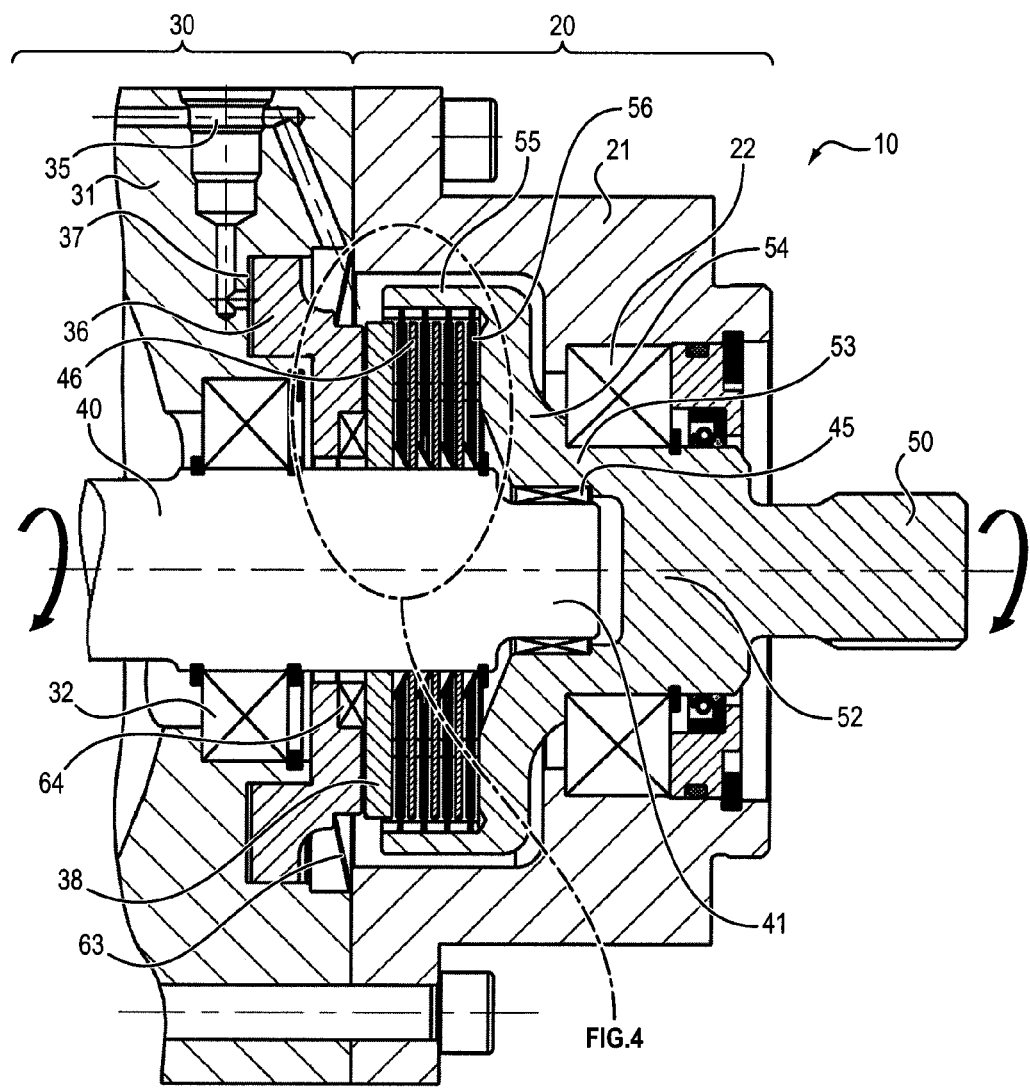

FIGS. 2 and 3 illustrate respectively a global view and a detailed view of a hydraulic apparatus according to an aspect of the invention.

Figure 4:
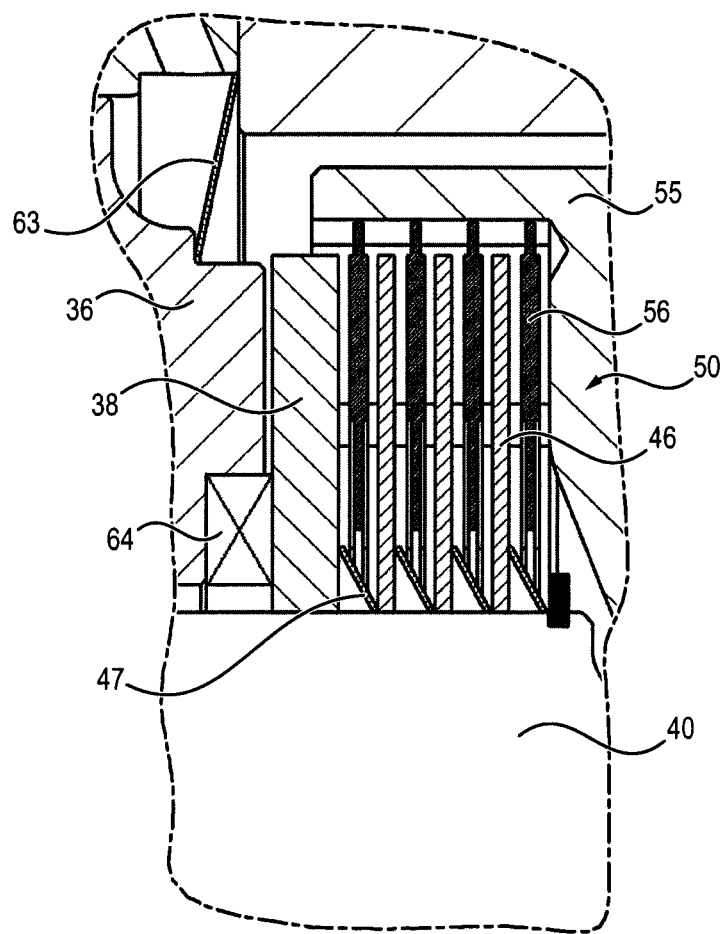
FIG. 4 is a detailed view of FIG. 3.

FIG. 4 is a detailed view of a specific part of FIG. 3, which is indicated on FIG. 3 by a circled area.

FIGS. 2 and 3 display a hydraulic apparatus 10 comprising
- a hydraulic machine 30, which is typically a hydraulic pump or motor, driving a machine shaft 40, and
- a clutch 20, comprising an clutch shaft 50 and adapted to engage the machine shaft 40 with the clutch shaft 50.

We define a proximal end 41 and a distal end 42 of the machine shaft 40, and a proximal end 51 and a distal end 52 of the clutch shaft 50.

The clutch shaft 50 can be either an input shaft if the hydraulic machine is a pump, or an output shaft if the hydraulic machine 30 is a motor.

The apparatus 10 as illustrated comprises a casing made of assembled parts, i.e.
- a machine casing 31,
- a clutch casing 21, these parts being typically bolted together so as to form a hermetic casing for the apparatus 10.

The hydraulic machine 30 can be of various types, such as
- a radial piston hydraulic machine, for instance with an internal cam or with an external cam;
- an axial piston hydraulic machine with a bent axis or a with an oscillating plate providing a variable displacement.

A specific example of such an hydraulic machine with axial piston and variable displacement which can be used in the present apparatus 10 is the hydraulic machine which is available under the reference "P90" by Poclain Hydraulics associated with a clutch such as the ones which are sold under the reference "series 600" by the society Logan.

In a more general way, the hydraulic machine 30 can be a pump with axial pistons and friction pads, having a rotating cylinder block with an associated valve plate, and a variable displacement through the inclination of a cam plate.

The machine shaft 40 is linked to the machine casing 31 through a first machine bearing 32 and a second machine bearing 32*bis*, and the clutch shaft 50 is linked to the clutch casing 21 through a clutch bearing 22. The machine shaft 40 and clutch shaft 50 are linked by a shaft bearing 45, which is typically located between the proximal end 41 of the machine shaft 40 and the distal end 52 of the clutch shaft 50.

Figure 1:
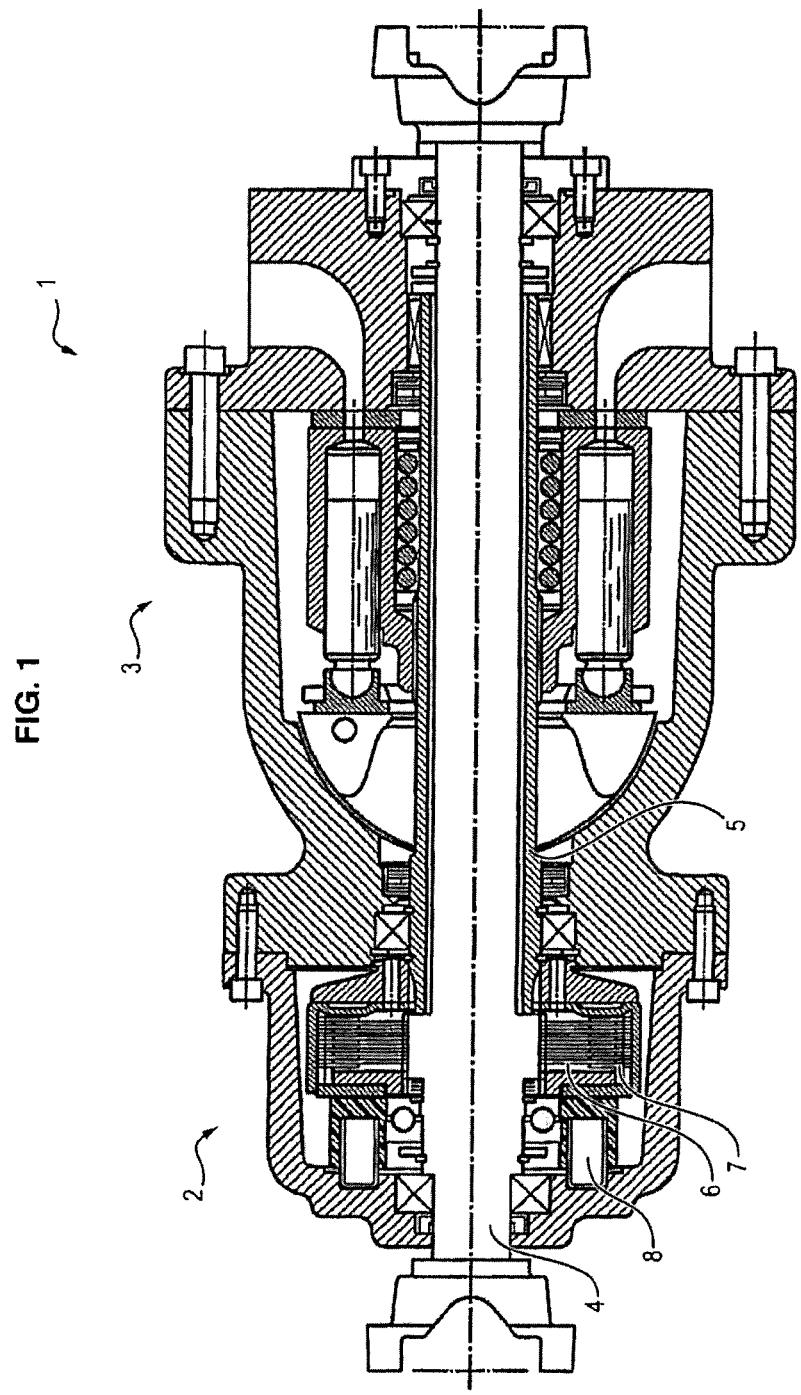

The machine shaft 40 is therefore maintained in position in the machine casing 31 by two bearings that ensure a proper positioning. The clutch shaft 50 is then associated to the machine shaft 40 with a degree of flexibility since the clutch shaft 50 itself is linked to the casing by a single bearing which allows for adaptation of the positioning of the clutch shaft 50 in view of the machine shaft 40, with the shaft bearing 45 ensuring the link between said machine and clutch shafts 40 and 50. This association of bearings therefore ensures the axial alignment of the clutch shaft 50 and the machine shaft 40, without requiring the extremely precise dimensioning constraints of an apparatus such as the apparatus disclosed in FIG. 1 and presented previously where each shaft is linked to a casing by two pairs of bearings, and each shaft therefore has no degree of mobility when associating the clutch shaft 50 to the machine shaft 40.

The distal end 52 of the clutch shaft 50 is advantageously bell-shaped, with a diameter that increases towards the free distal end of the clutch shaft 50, thereby defining an inner space to said distal end where the proximal end 41 of the machine shaft 40 fits.

In the illustrated embodiment, the clutch shaft 50 has a cylindrical main body, from which extend two successive concentrical ring shaped portions 53 and 55, linked by a tapered shoulder 54.

These two ring-shaped portions 53 and 55 and the tapered shoulder 54 define said inner space, with a diameter that increases from the first ring shaped portion 53 to the second ring shaped portion 55.

Therefore, in the illustrated embodiment, the inner space defined by the bell-shaped distal end 52 of the clutch shaft 50 can be divided into three portions:
- a proximal portion, which is roughly cylindrical, and has a first inner diameter d1,
- a distal portion, which is also roughly cylindrical, and has a second inner diameter d2, with d2>d1; and
- an intermediate portion, which is roughly conical and is disposed between said proximal portion and said distal portion, with a diameter that increases from d1 to d2.

This specific geometry of the clutch shaft 50 provides room to accommodate the proximal end 41 of the machine shaft 40 within said inner space, and more precisely to insert the shaft bearing 45 in said proximal portion of the inner space, around the proximal end 41 of the machine shaft 40.

The machine shaft and the distal portion of the bell-shaped distal end 52 of the clutch shaft 50 are provided with engaging means, adapted to engage so that the clutch shaft 50 and the machine shaft 40 rotate at the same speed.

In the illustrated embodiment, the engaging means are clutch discs 46 and 56, which are respectively linked to the machine shaft 40 and the clutch shaft 50. More precisely, the clutch discs 46 and 56 are located within the inner space defined by the bell-shaped distal end 52 of the clutch shaft 50, the clutch discs 56 of the clutch shaft 50 being linked to the inner surface of the distal portion of the bell-shaped distal end 52 of the clutch shaft 50. Said clutch discs 46 and 56 and coupled to clutch springs 47, which will maintain them separated by default.

An inlet port 35 is made in the machine casing 31 in order to enable the connection to a pressure source, which is adapted to increase pressure in a chamber 37 of clutch piston 36 in order to translate said clutch piston 36 along the axis of the machine shaft 40, which exerts pressure on a thrust washer 38 which itself will act on the clutch discs 46 and 56 in order to put them in contact, and thereby engaging the machine shaft 40 with the clutch shaft 50.

In the illustrated embodiment, said chamber 37 of clutch piston 36 is maintained by default in a position away from the thrust washer 38 and thereby away from the clutch discs 46 and 56 through a piston spring 63, which in the present embodiment lays on the clutch casing 21 to exert a pressure on the clutch piston 36. Said clutch piston 36 is centered by its chamber 37 in the casing 31 and exert a pressure on the washer 38 via an axial bearing 64. The washer 38 is sliding on the shaft 40 along axial splines. The washer 38 is not mechanically bolted to the clutch piston 36, but only pushed by the axial bearing 64.

Therefore, when no pressure is applied through the inlet port 35, the clutch piston 36 does not compress thrust washer 38 so that the clutch discs 46 and 56 are separated by clutch springs 47, and the machine shaft 40 is therefore not coupled to the clutch shaft 50.

The inlet port 35 is for instance fed by a hydraulic or pneumatic circuitry, an accumulator, or by an external or internal air-oil pressure multiplier or compressor.

The use of an accumulator provides means for having an appropriate pressure for engaging the discs 46 and 56 at the start of the apparatus.

The clutch can also be mechanically activated, for instance by using mechanical activation means for piloting the displacement of the clutch piston 36.

FIG. 3 shows that the clutch piston 36 is located at the junction between the clutch casing 21 and the machine casing 31, its chamber which is fed by the inlet port 35 is located within the machine casing 31 while it exerts a pressure on the thrust washer 38 which is located within the clutch casing 21.

In the illustrated embodiment, the clutch piston 36 is bell-shaped, and partially encompasses the machine bearing 32, the chamber of said clutch piston 36 being offset radially around the machine shaft 40 relatively to the machine bearing 32.

The clutch piston 36 is therefore embedded in the pump housing, and partially around the machine bearing 32 of the machine shaft 40.

The hydraulic machine 30 is typically associated with a charge pump 60, for instance a commonly known gerotor represented in FIG. 2, which is used for instance for delivering a scavenging pressure to the pump. This gerotor may include by-pass function by a pressure relief valve, as commonly known for pump scavenging circuits.

The invention thereby provides a hydraulic machine with an embedded clutch, which length is considerably decreased relatively to a conventional hydraulic machine and clutch assembly. The claimed invention also provides sufficient and reliable guidance of the clutch shaft, and ensures a safe torque transfer between the clutch shaft and the machine shaft, and a safe clutch release.

Such an apparatus can for instance be used no a vehicle for driving or assisting the driving of the wheels or of any other device of the vehicle.

Figure 5:
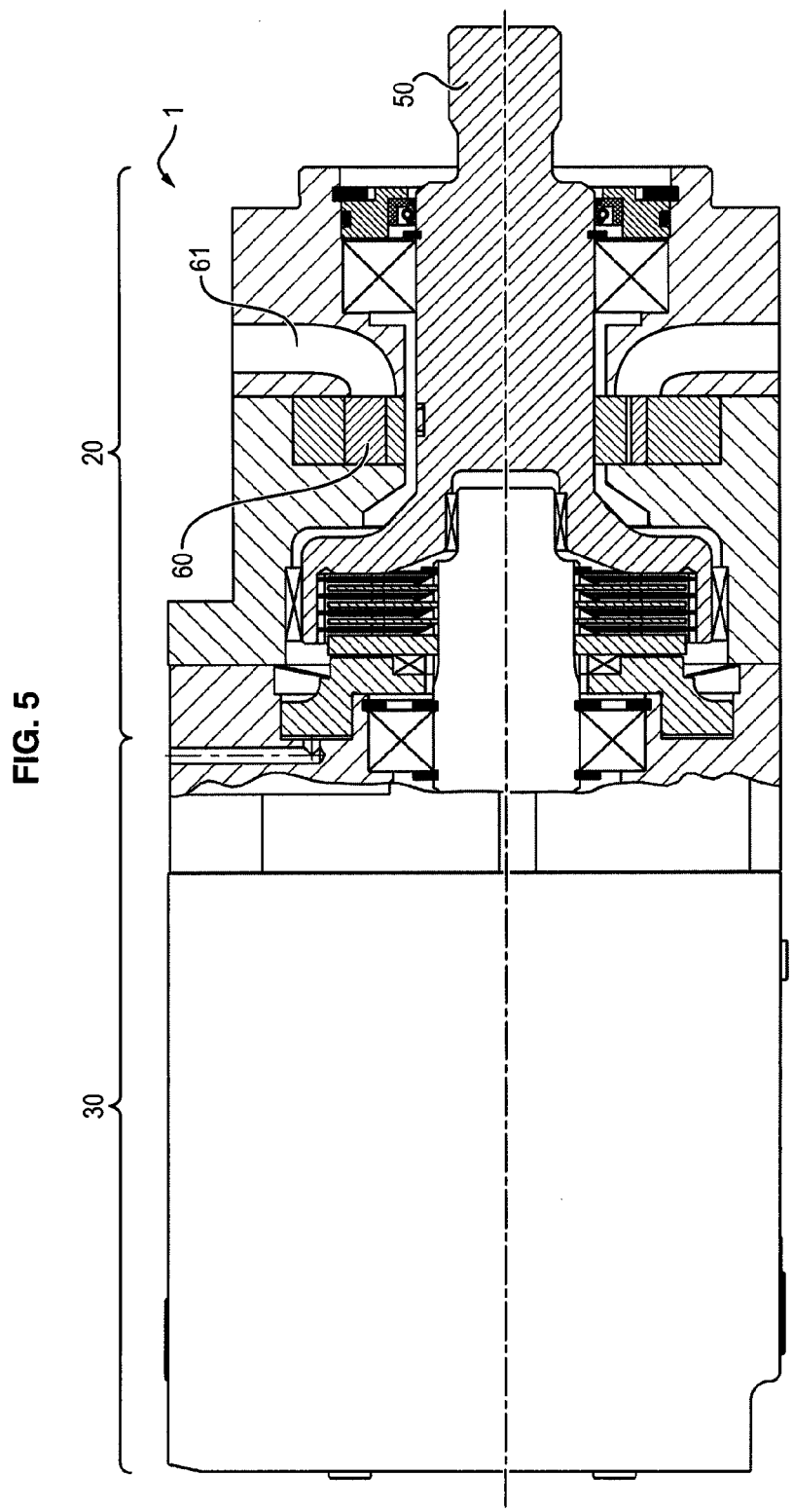
FIGS. 5 and 6 illustrate another aspect of the invention where the hydraulic apparatus is coupled to an hydraulic circuit comprising a scavenging and flushing pump.

FIG. 5 illustrates another embodiment of the assembly of FIG. 2, which depicts the feeding channels of the charge pump 60 used to deliver a scavenging pressure or a flushing flow to the assembly.

Such embodiment allows the system to have a flushing flow or a scavenging and piloting pressure as soon as the main engine is turning on, in a compact manner. This avoids excessive heating of the clutch in open position when the clutch shaft is turning on.

Figure 6:
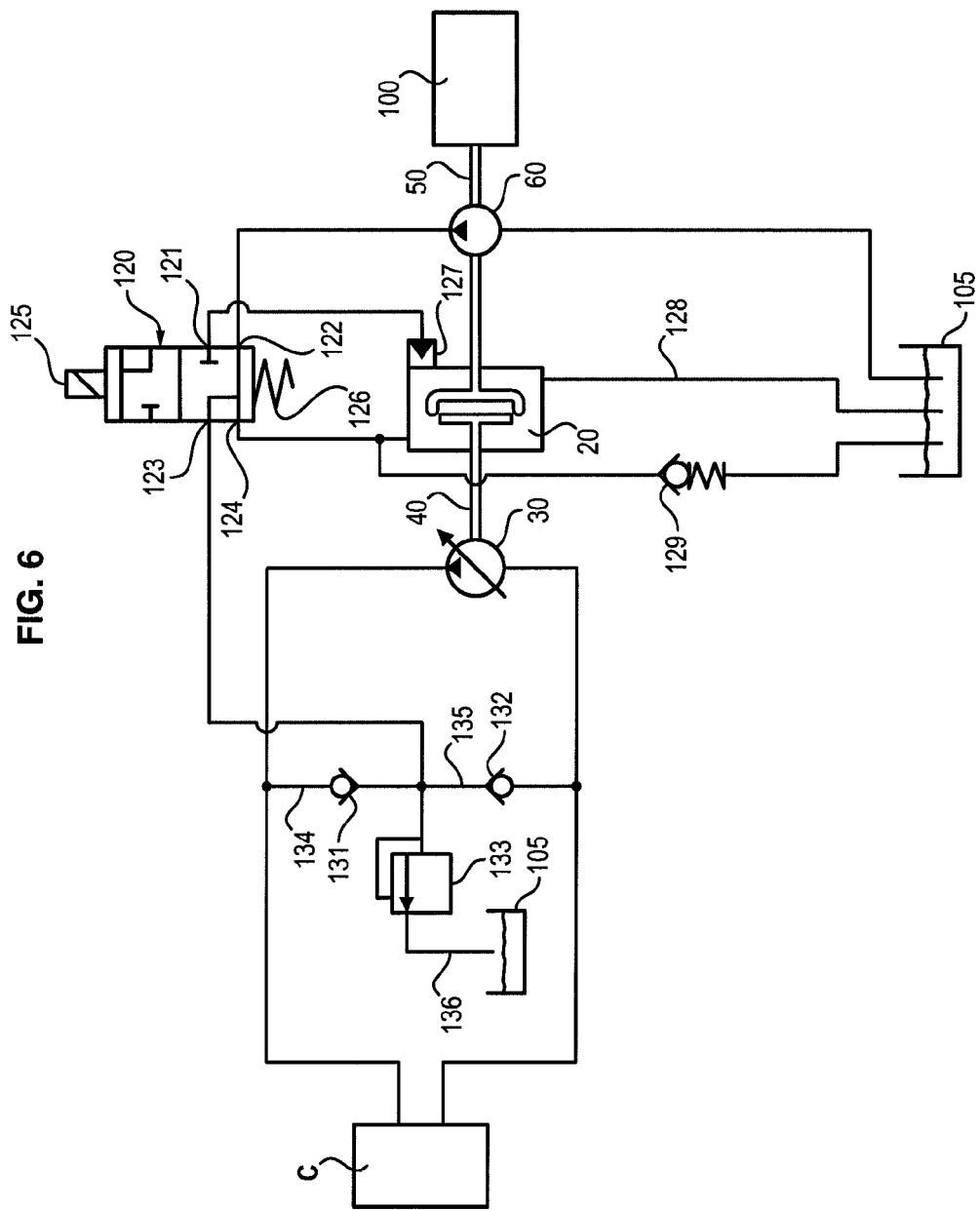

As illustrated in FIG. 6, the charge pump is fed in hydraulic pressure by hydraulic channels upstream of the clutch relatively to the hydraulic machine 30.

FIG. 6 represents the clutch 20, which is linked on one hand to the main engine 100 of a vehicle, for instance a thermal engine, through the clutch shaft 50, and on the other hand to the hydraulic machine 30 through the machine shaft 40; for instance a hydraulic engine or pump.

The clutch 20 is also linked to an atmospheric pressure tank 105 through a drain line 128 in order to allow for the flush of its oil.

The hydraulic machine is linked to a hydraulic circuit C. This hydraulic circuit C can comprise for instance a hydraulic machine such as an motor or a pump, or a load sensing circuit.

This hydraulic circuit comprises a charge circuit linked to the inlet and to the outlet of the hydraulic machine 30. This charge circuit is made according to a configuration well known by the man skilled in the art in order to regulate the pressure in said hydraulic circuit C, and comprises two charge channels 134 and 135, comprising no return valves 131 and 132, linked to said hydraulic circuit C by anti-return valves 131 and 132, and a discharge channel 136 linked to the atmospheric pressure tank 105 by a pressure limiter 133.

A charge pump 60 is coupled to the main engine 100, and linked to a distributor 120 which acts as piloting means of said charge pump 60.

The distributor 120 comprises 4 orifices:
a first orifice 121 which is linked to a command 127 of the clutch 20,
a second orifice 122 linked to the charge pump 60,
a third orifice 123 linked to a charge circuit of the hydraulic circuit C of the hydraulic machine 30,
a fourth orifice 124 linked to a flush channel of the clutch 20.

The distributor 120 can alternate between two configurations:
a first configuration where the first orifice 121 is closed, and the second 122, third 123 and fourth 124 orifices are connected together,
a second configuration where the first 121, second 122 and third 123 orifices are connected together, and the fourth orifice 124 is closed.

The distributor 120 is piloted by actuating means 125 which can bring it from its first configuration to its second configuration, and is maintained by default in its first configuration by elastic means 126 such as a spring.

In its first configuration, the distributor 120 enables the charge pump 60 to flush the clutch 20. The fluid passes through the clutch case, and goes back to the oil tank 105 by a drain line 128.

The flushing pressure is always lower to the opening pressure of the clutch, and the scavenging pressure defined by the pressure limiter 133.

In its second configuration, the distributor 120 enables the charge pump 60 to activate the clutch 20 through the command 127, and to charge the hydraulic circuit C of the hydraulic machine 30.

In the present embodiment, the flush channel of the clutch 20 is also connected to the atmospheric pressure tank 105 through a relief valve 129, which is typically calibrated to open at a pressure of 1 or 1.5 bar, in order to avoid an accidental engagement of the clutch 20 if the drain line 128 of the clutch 20 was to be obstructed.

This optional feature therefore provides an additional safety to the assembly.

This structure where the charge pump 60 is located upstream of the clutch 20 relatively to the main engine 100 provides a continuous charging when the main engine is turned on, regardless whether the clutch is engaged or disengaged.

Moreover, by coupling the clutch to such a charge pump 60, this structure provides a lubrication and a cleaning of the clutch in order to avoid overheating.

Other embodiments of this structure can be considered, for instance by providing two distinct charge pumps: a charge pump dedicated to the charging and the piloting of the clutch 20 which is located upstream of the clutch, and a second charge pump located downstream of the clutch, which will be dedicated to the charge of the hydraulic circuit C.

The charge pump 60 as presented in FIG. 6 can also be directly linked to the charge circuit of the hydraulic circuit C, considering that the distributor 120 connects this charge pump 60 to the charge circuit of the hydraulic circuit C in both its configurations.

The invention claimed is:

1. A hydraulic apparatus (10) comprising
a hydraulic machine (30) comprising a machine shaft (40) adapted to drive a cylinder block, said machine shaft (40) having a proximal end (41) and a distal end (42),
a clutch (20) comprising a clutch shaft (50) having a proximal end (51) and a distal end (52), and s a plurality of friction discs (56) linked to the distal end (52) of the clutch shaft (50) and a plurality of friction discs (46) linked to the proximal end (41) of the machine shaft (40), said discs (46, 56) being disposed radially around said machine shaft
(40), for selectively engaging said clutch shaft with said machine shaft, said apparatus (10), further comprising a piloting means (35), a clutch piston (36) and a thrust washer (38) surrounding said machine shaft, said piloting means (35) being adapted to apply a piloting pressure on said clutch piston (36) which transmits said piloting pressure to said thrust washer (38), which itself transmits said piloting pressure to said discs (46, 56),
said machine shaft (40) and clutch shaft (50) are located within a casing defining a common inner space which holds both shafts (40, 50), said machine shaft (40) being connected to said casing by two machine bearings (32, 32bis), said clutch shaft (50) being connected to the casing by a single clutch bearing (22), and said machine shaft (40) and clutch shaft (50) are centered by a centering bearing (45) adapted to provide a centering of said shafts (40, 50) relative to each other characterized in that the distal end (52) of said clutch shaft (50) is bell-shaped so as to surround the proximal end (41) of said machine shaft (40), said bell shape defining an inner space where the proximal end (41) of the machine shaft (40) and the friction discs (56) linked to the clutch shaft (50) are located, and in that the said clutch piston (36) is bell-shaped and at least partially surrounds one of said two machine bearings (32).

2. The apparatus (10) according to claim 1, wherein said casing comprises a machine casing (31) within which is located the hydraulic machine (30), and a clutch casing (21) within which is located the clutch (20), said casings (21, 31) defining a common internal space, the clutch piston (36) being located within the machine casing (31) so that its displacement brings it into contact with the thrust washer (38) located within the clutch casing (21).

3. The apparatus (10) according to claim 2, wherein the clutch piston (36) is associated with a piston spring (63) resting on the clutch casing (21), and opposing the displacement of the clutch piston (36) resulting from an increase in pressure within the chamber of the clutch piston (36).

4. The apparatus (10) according to claim 3, comprising an accumulator or a compressor adapted to feed said piloting means.

5. A vehicle comprising a hydraulic apparatus (10) according to claim 4.

6. A vehicle according to claim 5, wherein the clutch shaft (50) is linked to a main engine of said vehicle, and which comprises a charge pump coupled to an engine shaft, upstream of the clutch (20) relatively to the main engine, said charge pump being linked to a valve so that it selectively flushes the clutch, charges the hydraulic machine and activates the clutch.

7. A vehicle comprising a hydraulic apparatus (10) according to claim 3.

8. A vehicle according to claim 7, wherein the clutch shaft (50) is linked to a main engine of said vehicle, and which comprises a charge pump coupled to an engine shaft, upstream of the clutch (20) relatively to the main engine, said charge pump being linked to a valve so that it selectively flushes the clutch, charges the hydraulic machine and activates the clutch.

9. The apparatus (10) according to claim 2, comprising an accumulator or a compressor adapted to feed said piloting means.

10. A vehicle comprising a hydraulic apparatus (10) according to claim 9.

11. A vehicle according to claim 10, wherein the clutch shaft (50) is linked to a main engine of said vehicle, and which comprises a charge pump coupled to an engine shaft, upstream of the clutch (20) relatively to the main engine, said charge pump being linked to a valve so that it selectively flushes the clutch, charges the hydraulic machine and activates the clutch.

12. A vehicle comprising a hydraulic apparatus (10) according to claim 2.

13. A vehicle according to claim 12, wherein the clutch shaft (50) is linked to a main engine of said vehicle, and which comprises a charge pump coupled to an engine shaft, upstream of the clutch (20) relatively to the main engine, said charge pump being linked to a valve so that it selectively flushes the clutch, charges the hydraulic machine and activates the clutch.

14. The apparatus (10) according to claim 1, comprising an accumulator or a compressor adapted to feed said piloting means.

15. A vehicle comprising a hydraulic apparatus (10) according to claim 14.

16. A vehicle according to claim 15, wherein the clutch shaft (50) is linked to a main engine of said vehicle, and which comprises a charge pump coupled to an engine shaft, upstream of the clutch (20) relatively to the main engine, said charge pump being linked to a valve so that it selectively flushes the clutch, charges the hydraulic machine and activates the clutch.

17. A vehicle comprising a hydraulic apparatus (10) according to claim 1.

18. A vehicle according to claim 17, wherein the clutch shaft (50) is linked to a main engine of said vehicle, and which comprises a charge pump coupled to an engine shaft, upstream of the clutch (20) relatively to the main engine, said charge pump being linked to a valve so that it selectively flushes the clutch, charges the hydraulic machine and activates the clutch.

* * * * *